(12) United States Patent
Hilfrich et al.

(10) Patent No.: US 11,201,370 B2
(45) Date of Patent: Dec. 14, 2021

(54) BATTERY HOUSING FOR A VEHICLE BATTERY AND CHASSIS FOR AN ELECTRIC VEHICLE

(71) Applicants: ThyssenKrupp Steel Europe AG, Duisburg (DE); thyssenkrupp AG, Essen (DE)

(72) Inventors: Erik Hilfrich, Dusseldorf (DE); Daniel Nierhoff, Mulheim an der Ruhr (DE)

(73) Assignees: ThyssenKrupp Steel Europe AG, Duisburg (DE); thyssenkrupp AG, Essen (DE)

( * ) Notice: Subject to any disclaimer, the term of this patent is extended or adjusted under 35 U.S.C. 154(b) by 60 days.

(21) Appl. No.: 16/487,675

(22) PCT Filed: Feb. 21, 2018

(86) PCT No.: PCT/EP2018/054195
§ 371 (c)(1),
(2) Date: Mar. 11, 2020

(87) PCT Pub. No.: WO2018/153880
PCT Pub. Date: Aug. 30, 2018

(65) Prior Publication Data
US 2020/0198453 A1    Jun. 25, 2020

(30) Foreign Application Priority Data
Feb. 22, 2017   (DE) .................... 10 2017 103 653.9

(51) Int. Cl.
*H01M 50/20* (2021.01)
*B60L 50/60* (2019.01)
(Continued)

(52) U.S. Cl.
CPC ............... *H01M 50/20* (2021.01); *B60K 1/04* (2013.01); *B60L 50/66* (2019.02); *B62D 25/20* (2013.01);
(Continued)

(58) Field of Classification Search
CPC ...................................................... H01M 50/20
See application file for complete search history.

(56) References Cited

U.S. PATENT DOCUMENTS 6,227,322 B1   5/2001 Nishikawa
2002/0162696 A1* 11/2002 Maus .................... H01M 50/20
                                                    180/68.5
(Continued)

FOREIGN PATENT DOCUMENTS

CN   102897010 A   1/2013
CN   205113470 U   3/2016
(Continued)

OTHER PUBLICATIONS

German Office Action for DE Application No. 10 2017 103 653.9 dated Dec. 4, 2017.
(Continued)

*Primary Examiner* — James A Shriver, II
*Assistant Examiner* — Michael T. Walsh
(74) *Attorney, Agent, or Firm* — RMCK Law Group PLC

(57) ABSTRACT

A battery housing for a vehicle battery includes side walls which laterally delimit an interior of the battery housing, with a mounting frame running externally around the side walls for mounting the battery housing on a chassis of an electric vehicle, and with a floor structural element delimiting the interior of the battery housing at the bottom, wherein a first reinforcing profile for reinforcing the floor structural element is arranged on said floor structural ele-
(Continued)

ment, and/or a second reinforcing profile for reinforcing the mounting frame is arranged on said mounting frame.

6 Claims, 6 Drawing Sheets

(51) Int. Cl.
  *B60K 1/04* (2019.01)
  *B62D 25/20* (2006.01)
(52) U.S. Cl.
  CPC . *B60K 2001/0438* (2013.01); *H01M 2220/20* (2013.01)

(56) References Cited

U.S. PATENT DOCUMENTS

| | | | |
|---|---|---|---|
| 2010/0307848 A1 | 12/2010 | Hashimoto et al. | |
| 2011/0262801 A1* | 10/2011 | Schwab | B60K 1/04 429/163 |
| 2012/0121959 A1* | 5/2012 | Yamada | B60K 1/04 429/100 |
| 2012/0223113 A1 | 9/2012 | Gaisne et al. | |
| 2014/0014428 A1 | 1/2014 | Yanagi | |
| 2015/0249240 A1 | 9/2015 | Hihara et al. | |
| 2016/0204401 A1* | 7/2016 | Curtis | H01M 50/20 429/153 |
| 2016/0207418 A1* | 7/2016 | Bergstrom | B60G 3/06 |
| 2016/0257219 A1* | 9/2016 | Miller | B60L 50/66 |
| 2016/0311301 A1* | 10/2016 | Ikeda | B60K 1/04 |
| 2018/0109328 A1* | 4/2018 | Eberhard | G02B 6/4214 |
| 2019/0131602 A1* | 5/2019 | Hilfrich | H01M 50/20 |
| 2019/0214615 A1* | 7/2019 | Hilmann | B60L 3/0007 |
| 2019/0221797 A1* | 7/2019 | Nierhoff | H01M 50/20 |
| 2019/0252741 A1* | 8/2019 | Gunther | H01M 10/613 |
| 2019/0393460 A1* | 12/2019 | Wesche | B60K 1/04 |
| 2020/0130516 A1* | 4/2020 | Schwarz | B21D 11/08 |

FOREIGN PATENT DOCUMENTS

| | | |
|---|---|---|
| CN | 105848943 A | 8/2016 |
| DE | 69302845 | 7/1996 |
| DE | 102010022876 A1 | 1/2011 |
| DE | 102011052513 A1 | 2/2013 |
| EP | 2072308 B1 | 5/2014 |
| EP | 3088225 A1 | 11/2016 |
| WO | 2011061571 A1 | 5/2011 |
| WO | 2013020707 A2 | 2/2013 |

OTHER PUBLICATIONS

International Search Report and Written Opinion for International Application No. PCT/EP2018/054195 dated Jul. 25, 2018.
Chinese Office Action for CN Application No. 201880013276.X dated Jul. 30, 2021.

* cited by examiner

BATTERY HOUSING FOR A VEHICLE BATTERY AND CHASSIS FOR AN ELECTRIC VEHICLE

FIELD

The present invention concerns a battery housing for a vehicle battery, with side walls which laterally delimit an interior of the battery housing, with a mounting frame running externally around the side walls for mounting the battery housing on a chassis of an electric vehicle, and with a floor structural element which delimits the interior of the battery housing at the bottom. The invention also relates to a chassis for an electric vehicle, with a chassis floor structural element running in particular horizontally, and with a battery housing for a vehicle battery which is arranged above or below the chassis floor structural element.

BACKGROUND

Electric vehicles typically have a vehicle battery for storing electrical energy which may be used to supply an electric drive and further electrical equipment of the electric vehicle. Usually, such vehicle batteries have a battery housing with an interior for receiving one or more battery modules. The interior is typically delimited at the sides by several side walls and at the bottom by a floor structural element. In order to be able to connect the battery housing to a chassis of an electric vehicle, usually a mounting frame is provided which runs around the battery housing on the outside of the side walls.

Such battery housings must be resistant to crash loads in order to protect the battery module from damage as effectively as possible. For protecting the sides against crash loads, it is known in the prior art to form the mounting frame from an ultrahigh-strength material.

It has however proved disadvantageous that the mounting frame of such a battery housing can collapse in the event of a crash despite the ultrahigh-strength materials, and thus the battery housing does not offer adequate crash performance.

SUMMARY

In this context, it is the object of the present invention to improve the protection of the vehicle battery against crash loads which act on the battery housing from the sides of the battery housing.

This object is achieved by a battery housing for a vehicle battery, with side walls which laterally delimit an interior of the battery housing, with a mounting frame running externally around the side walls for mounting the battery housing on a chassis of an electric vehicle, and with a floor structural element which delimits the interior of the battery housing at the bottom, wherein at least one first reinforcing profile for reinforcing the floor structural element is arranged on said floor structural element, and/or at least one second reinforcing profile for reinforcing the mounting frame is arranged on said mounting frame.

The reinforcing profile arranged on the mounting frame and/or on the floor structural element increases the resistance of the battery housing to crash loads acting from a side of the battery housing. In this way, the vehicle battery arranged in the interior of the battery housing can be better protected against lateral crash loads.

According to the invention, the floor structural element is a double floor of the battery housing and comprises a floor cavity, and at least the first reinforcing profile is arranged inside the floor cavity. The reinforcing profile inside the floor cavity may increase the stiffness of the floor structural element. The reinforcing profile preferably extends in a horizontal direction, i.e. it runs parallel to a line connecting two opposing side walls of the battery housing. It is preferred if the reinforcing profile extends from a first inner wall of the floor cavity in the horizontal direction at least 20 mm into the floor cavity. Preferably, the reinforcing profile lies on an upper inner wall of the floor cavity and on a lower inner wall of the floor cavity.

An alternative or additional embodiment of the invention provides that the mounting frame comprises a mounting frame hollow structural element with a mounting frame cavity, and at least the second reinforcing profile is arranged inside the mounting frame cavity. The reinforcing profile inside the mounting frame hollow structural element may increase the stiffness of the mounting frame so as to avoid a collapse of the reinforcing profile under lateral crash loads. The mounting frame hollow structural element is preferably a sectional beam with an open or closed beam profile, i.e. a C-shaped profile, a U-shaped profile or a rectangular profile. The mounting frame cavity preferably extends in the horizontal direction, i.e. it runs parallel to a line connecting two opposing side walls of the battery housing. It is preferred if the reinforcing profile extends in the horizontal direction from a first inner wall of the mounting frame cavity to an opposite second inner wall of the mounting frame cavity. Preferably, the reinforcing profile lies on an upper inner wall of the mounting frame cavity and on a lower inner wall of the mounting frame cavity. It has proved particularly preferable if the mounting frame comprises several mounting frame hollow structural elements which are connected together so as to form a mounting frame running around the outer contour of the battery housing, so that mounting points can be provided on several sides of the battery housing, via which points the battery housing can be mounted on a chassis.

A chassis in the sense of the invention is a floor structure of an electric vehicle.

Advantageous embodiments and refinements of the invention are given in the subclaims and the description with reference to the drawings.

According to a further advantageous embodiment, it is provided that the mounting frame has a mounting frame hollow structural element with a mounting frame cavity adjoined by two floor structural elements, in particular with a floor cavity arranged in between, and the mounting frame cavity transforms directly into the floor cavity, wherein at least the second reinforcing profile is arranged inside the mounting frame cavity and inside the floor cavity. In such an embodiment, the reinforcing profile runs from the mounting frame cavity into the floor cavity and thereby not only stiffens the mounting frame and the floor structural element, but also the transitional region between the mounting frame and the floor structural element. Preferably, the reinforcing profile lies on an upper inner wall of the floor cavity, an upper inner wall of the mounting frame cavity, a lower inner wall of the floor cavity, and a lower inner wall of the mounting frame cavity. The mounting frame hollow structural element is preferably a sectional beam with an open beam profile, e.g. a C-shaped profile, a U-shaped profile. The floor cavity may also be open towards a side adjacent to the mounting frame hollow structural element.

It has furthermore proved advantageous if the mounting frame hollow structural element is connected to a side wall and at least the first reinforcing profile has a profile cross-section which is arranged parallel to the side wall. Such an arrangement of the reinforcing profile may increase the bending strength and/or intrusion resistance of the mounting frame against crash loads which act from a direction oriented perpendicularly to the surface of the side wall. Particularly preferably, the first reinforcing profile has a flange which connects, in particular joins, the first reinforcing profile to the side wall.

Preferably, at least the first and/or second reinforcing profile has a profile cross-section which has a meandering profile, a wave profile, a top-hat profile, a C-shaped profile or a rectangular profile. The first and/or second reinforcing profile may be configured integrally or be composed of several partial reinforcing profiles. For example, a reinforcing profile with a meandering profile may be formed from a plurality of partial reinforcing profiles of top-hat shape.

A preferred embodiment provides that at least the first and/or second reinforcing profile has a first profile cross-section along a first cross-sectional plane, and a second profile cross-section along a second cross-sectional plane parallel to the first cross-sectional plane, wherein the first and second profile cross-sections are different. To this extent, the profile cross-section changes in a longitudinal direction perpendicular to the first and second cross-sectional planes. Such an embodiment is advantageous in particular for applications in which the reinforcing profile is arranged inside a cavity with a cross-section which varies in the longitudinal direction.

It is furthermore preferred if at least the first and/or second reinforcing profile has a first material thickness in a first region of the reinforcing profile and a second material thickness in a second region of the reinforcing profile, wherein the first and second material thicknesses are different. In this way, the reinforcing profile can be designed according to the loads, wherein more heavily loaded regions have a greater material thickness and less heavily loaded regions have a smaller material thickness. Particularly preferably, the reinforcing profile may be produced from a semi-finished product with regions of different material thickness, for example a tailored blank/strip, a tailor-welded blank/strip, or a tailor-rolled blank/strip. For example, the ratio of the first material thickness to the second material thickness may be at least 1:2. Partial reinforcing profiles of different material thickness may be used in a reinforcing profile which is formed from several partial reinforcing profiles.

An embodiment has proved advantageous in which at least the first and/or second reinforcing profile comprises one or more cut-outs, whereby the weight of the reinforcing profile can be reduced. Preferably, the reinforcing profile has a higher density of cut-outs in a third region than in a fourth region. A higher density of cut-outs may be provided in less heavily loaded regions than in more heavily loaded regions of the reinforcing profile.

An advantageous embodiment provides that the first reinforcing profile is joined to an inner wall delimiting the floor cavity, and/or the second reinforcing profile is joined to an inner wall delimiting the mounting frame cavity, and/or the second reinforcing profile is joined to a floor structural element. The stability of the assembly of mounting frame hollow structural element and reinforcing profile, or floor structural element and reinforcing profile, may thereby be further increased. Particularly preferably, the first reinforcing profile is joined to two opposing inner walls of the floor cavity. The second reinforcing profile is preferably joined to two opposing inner walls of the mounting frame cavity, wherein an inner wall of the mounting frame cavity particularly preferably is a side wall of the battery housing.

Particularly preferably, the first reinforcing profile has a first flange via which the first reinforcing profile is connected to the side wall, and/or a second flange via which the first reinforcing profile is connected to the mounting frame. In an embodiment in which the second reinforcing profile is arranged inside the mounting frame cavity and inside the floor cavity, the reinforcing profile is preferably joined to two opposing inner walls of the floor cavity and two opposing inner walls of the mounting frame cavity.

A further advantageous embodiment provides that an edge reinforcing element is arranged between one of the side walls and the floor structural element of the battery housing and is connected, in particular joined, to a side wall and the floor structural element. The edge reinforcing element may further improve the crash performance. Preferably, the edge reinforcing element comprises a plate-like profile cross-section. Particularly preferably, beads are provided in the edge reinforcing element.

The object cited initially is furthermore achieved by a chassis for an electric vehicle, with a chassis floor structural element running in particular horizontally, and with a battery housing for a vehicle battery which is arranged above or below the chassis floor structural element, wherein a third reinforcing profile for reinforcing the chassis floor structural element is arranged on said chassis floor structural element.

The third reinforcing profile arranged on the chassis floor structural element increases the resistance of the chassis against crash loads acting from the side. The vehicle battery arranged in the interior may thereby be better protected from lateral crash loads.

An advantageous embodiment of the chassis according to the invention provides that the chassis floor structural element is part of a double floor of the chassis which comprises a chassis cavity, and at least the third reinforcing profile is arranged inside the chassis cavity. The reinforcing profile inside the chassis cavity may increase the stiffness of the chassis floor structural element. The chassis floor structural element may be configured as a one-piece hollow structural element, wherein the chassis cavity is provided inside the chassis floor structural element, for example as a hollow box or hollow box girder. Alternatively, it is possible that the floor structural element is connected to further floor structural elements such that together they form the chassis cavity. The chassis cavity extends preferably in the horizontal direction, i.e. it runs parallel to a line connecting two opposing sills of the chassis. It is preferred if at least the reinforcing profile extends in the horizontal direction from a first inner wall of the chassis cavity to an opposing second inner wall of the chassis cavity. Preferably, the connecting profile lies on an upper inner wall of the chassis cavity and on a lower inner wall of the chassis cavity.

It is advantageous if at least the third reinforcing profile has a profile cross-section which has a meandering profile, a wave profile, a top-hat profile, a C-shaped profile or a rectangular profile. The at least first and/or second reinforcing profile may be configured integrally or be composed of several partial reinforcing profiles. For example, a reinforcing profile with a meandering profile may be formed from a plurality of partial reinforcing profiles of top-hat shape. It is particularly advantageous if at least the third reinforcing profile has a first profile cross-section in a first cross-sectional plane, and a second profile cross-section in a second cross-sectional plane parallel to the first cross-sectional plane, wherein the first and second profile cross-sections are different. To this extent, the profile cross-section varies in a longitudinal direction perpendicular to the first and second cross-sectional planes. Such an embodiment is advantageous in particular for applications in which the reinforcing profile is arranged inside a cavity with a cross-section which varies in the longitudinal direction. It is furthermore preferred if the third reinforcing profile has a first material thickness in a first region of the reinforcing profile and a second material thickness in a second region of the reinforcing profile, wherein the first and second material thicknesses are different. In this way, the reinforcing profile can be designed according to the load, wherein more heavily loaded regions have a greater material thickness and less heavily loaded regions have a smaller material thickness. An embodiment has proved advantageous in which the third reinforcing profile has one or more cut-outs, whereby the weight of the reinforcing profile may be reduced.

Further details, features and advantages of the invention arise from the drawings and from the following description of preferred embodiments with reference to the drawings. The drawings illustrate solely exemplary embodiments of the invention which do not restrict the essential inventive concept.

DETAILED DESCRIPTION

In the various figures, the same parts always carry the same reference signs and are therefore usually only cited or mentioned once.

Figure 1:
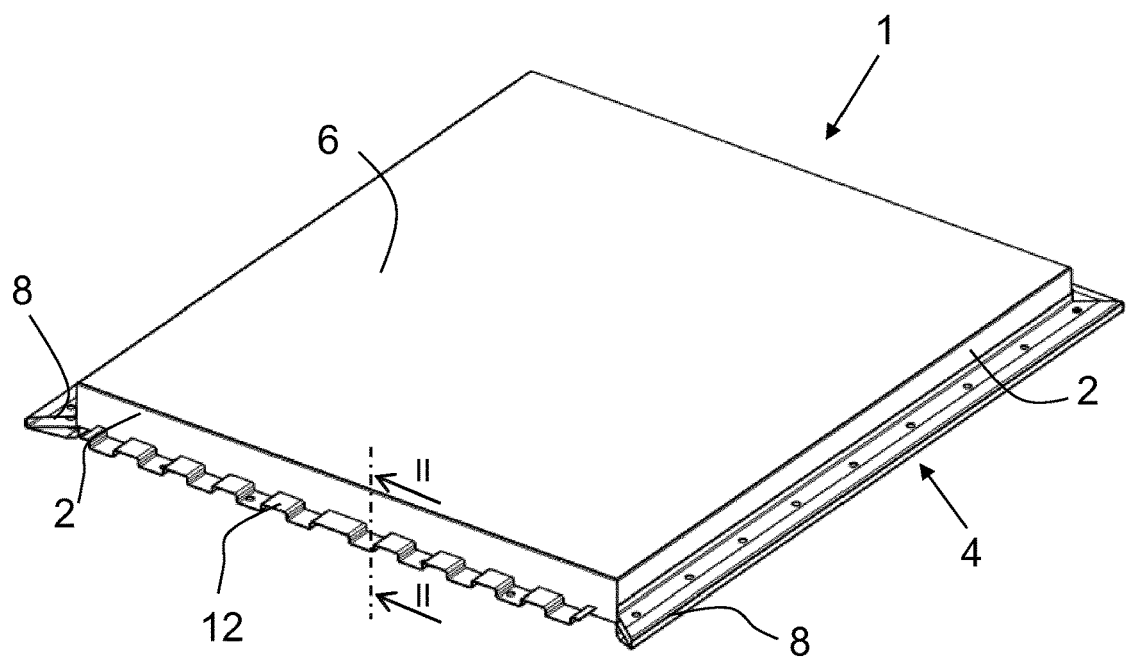
FIG. 1 shows a battery housing according to a first exemplary embodiment of the invention in a perspective view.
Figure 2:
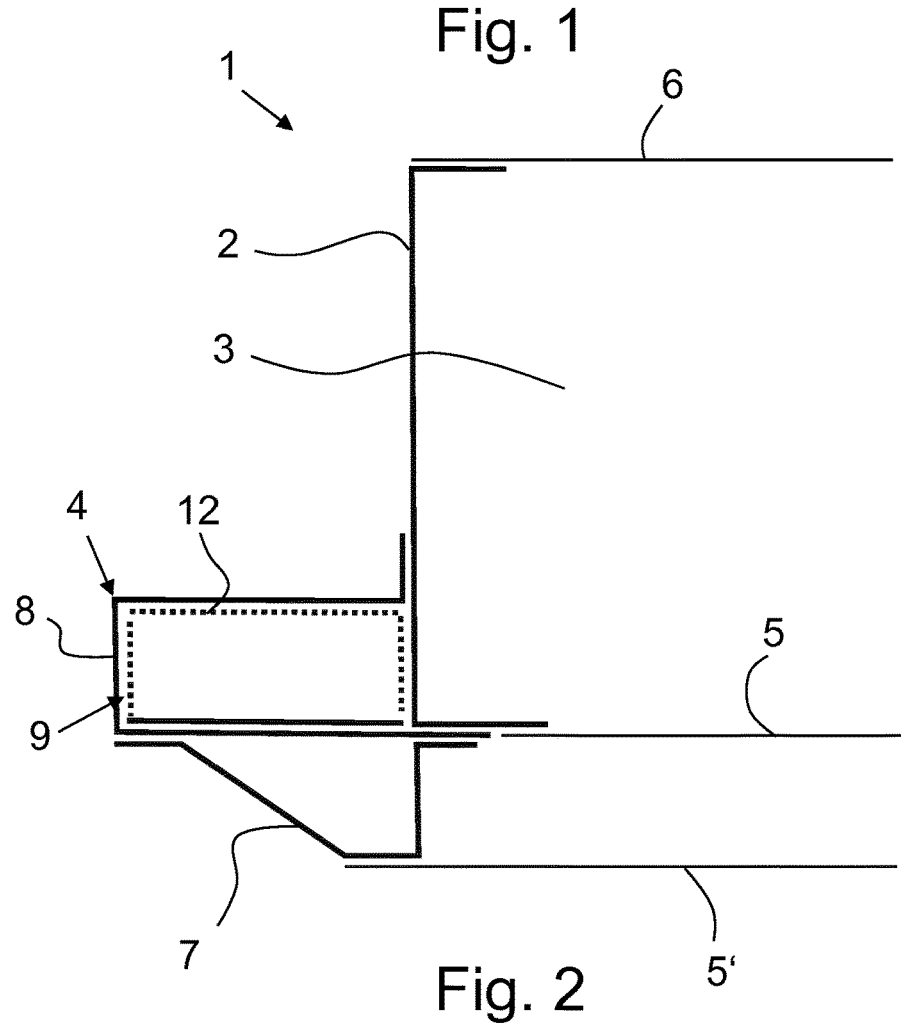
FIG. 2 shows the battery housing from FIG. 1 in a diagrammatic sectional depiction along the section line II-II shown in FIG. 1.

FIGS. 1 and 2 show a battery housing 1 for a vehicle battery according to a first exemplary embodiment of the present invention. A vehicle battery which supplies an electric vehicle with electrical energy, for example for operating an electric drive and/or electric equipment of the electric vehicle, may be arranged in the battery housing 1.

The battery housing 1 has an interior 3 which may comprise one or more module receivers for receiving battery modules of the vehicle battery. At the top, the interior is delimited by a housing cover 6. At the sides of the interior 3 are side walls 2 which delimit the interior at the sides. At the bottom, the interior 3 is delimited by a first floor structural element 5. The first floor structural element 5 seals the interior 3 at the bottom, in particular against the penetration of splash water. A second floor structural element 5', which serves as under-run protection, is provided below the first floor structural element 5. The first and the second floor structural elements 5, 5' together form a floor structure in the manner of a double floor. A further component of the battery housing 1 is a mounting frame 4, via which the battery housing 1 may be mounted on a chassis of an electric vehicle. The mounting frame 4 is arranged on the outsides of the side walls 2 and runs around the battery housing 1. The mounting frame 4 can form the connection to the chassis. To this extent, it is possible to connect the battery housing 1 to the chassis on any side via the mounting frame 4. The mounting frame comprises several mounting frame hollow structural elements 8 which are connected together. In the first exemplary embodiment, the mounting frame hollow structural elements 8 are formed as open profile beams which have a mounting frame cavity 9. Beams 7 are arranged below the mounting frame hollow structural elements 8.

The mounting frame 4 has been omitted from the drawing on the left-hand side in order to show the reinforcing profile 12 situated therein (FIG. 1).

In order to increase the resistance of the battery housing 1 against crash loads acting from a side of the battery housing 1, a reinforcing profile 12 is arranged on the mounting frame hollow structural element 8 to reinforce the mounting frame hollow structural element 8. The reinforcing profile 12 is arranged inside the mounting frame cavity 9 of the mounting frame hollow structural element 8. The reinforcing profile 12 completely fills the height of the mounting frame cavity 9. It is joined to the mounting frame hollow structural element 8 both on the upper inside of the mounting frame hollow structural element 8 and on the lower inside of the mounting frame hollow structural element 8. Furthermore, the reinforcing profile 12 lies on the side wall 2 which delimits the mounting frame cavity 9. The reinforcing profile 12 is also joined to this side wall 2. The reinforcing profile 12 is oriented inside the mounting frame cavity such that its meander-like profile cross-section is arranged parallel to the side wall 2. Alternatively, the reinforcing profile 12 may have another profile cross-section, for example in the form of a wave profile, a top-hat profile, a C-shaped profile or a rectangular profile.

Figure 3:
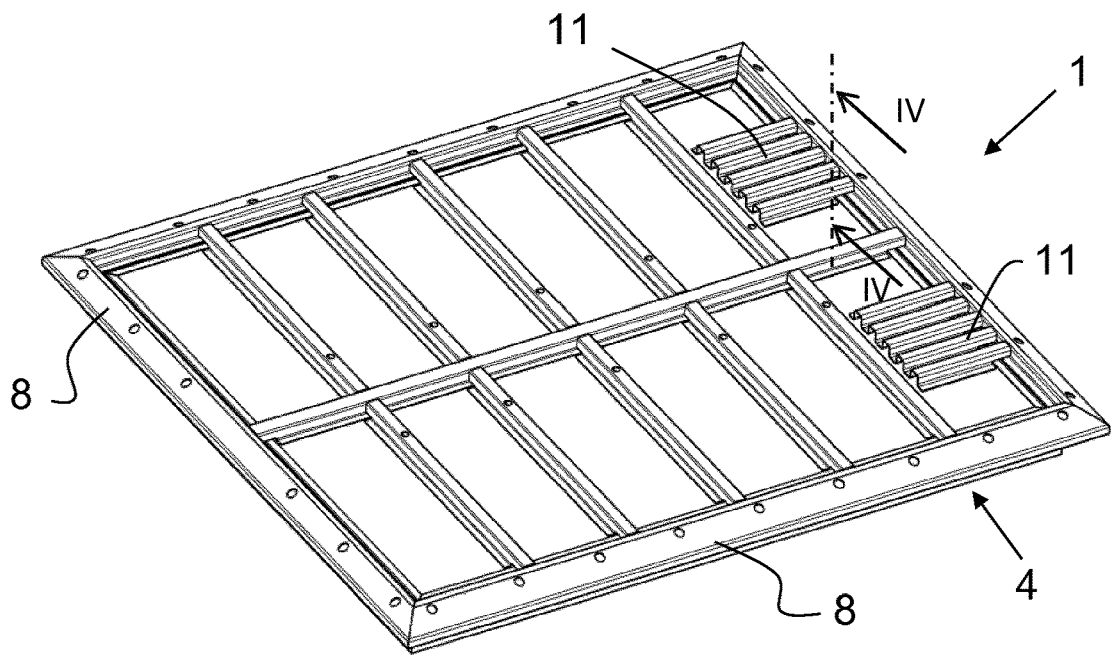
FIG. 3 shows a battery housing according to a second exemplary embodiment of the invention in a perspective view.
Figure 4:
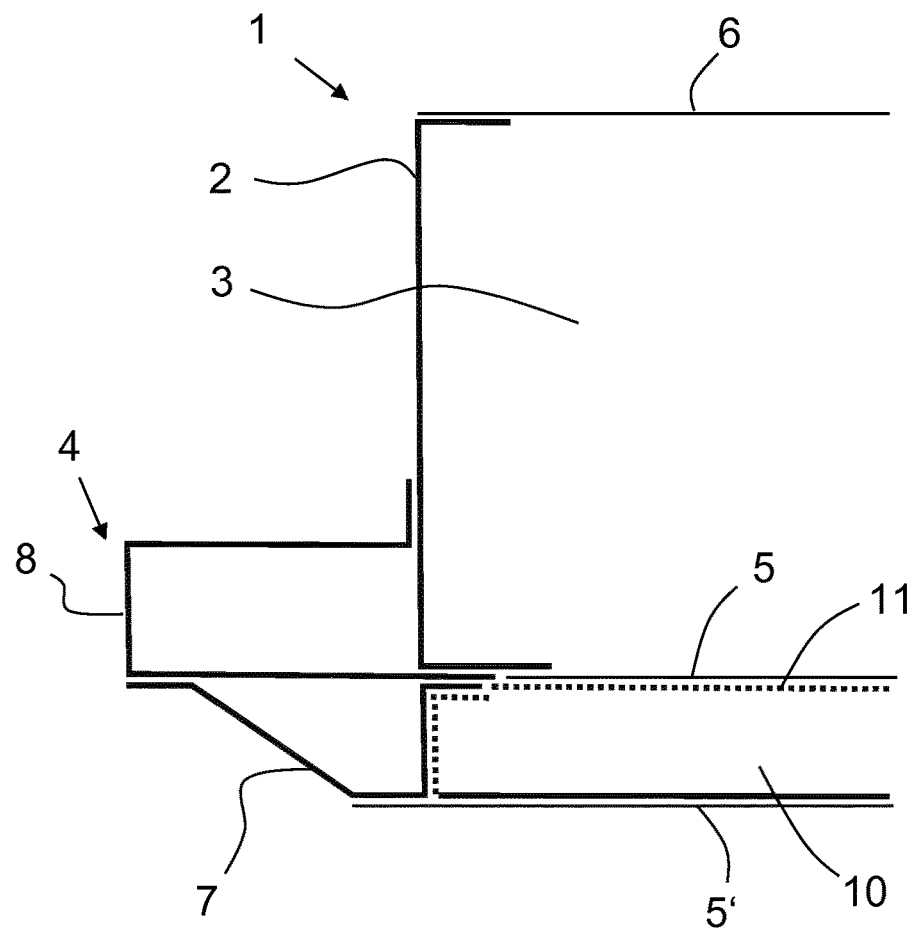
FIG. 4 shows the battery housing from FIG. 3 in a diagrammatic sectional depiction along the section line IV-IV shown in FIG. 3.

FIGS. 3 and 4 illustrate a second exemplary embodiment of a battery housing 1 according to the invention. This battery housing 1 has a structure which is substantially similar to that of the battery housing of the first exemplary embodiment. In contrast to the first exemplary embodiment, in the second exemplary embodiment a reinforcing profile 11 is arranged on the floor structural elements 5, 5' in order to reinforce the floor structural elements 5, 5'. In this way, the resistance of the battery housing 1 to crash loads acting from a side of the battery housing 1 is increased.

The under-run protection 5' has been omitted from the drawing to show the reinforcing profile 11.

The floor structural elements 5, 5' form a double floor of the battery housing 1 which has a floor cavity 10, and the reinforcing profile 11 is arranged inside the floor cavity 10. The floor cavity 10 extends in the horizontal direction, i.e. it runs parallel to a line connecting two opposing side walls 2 of the battery housing 1. The reinforcing profile 11 extends in the horizontal direction from a first inner wall of the floor cavity 10 to an opposing second inner wall of the floor cavity. The reinforcing profile 11 lies on an upper inner wall of the floor cavity 10 and on a lower inner wall of the floor cavity 10. It is joined to the first floor structural element 5 at the top and to the second floor structural element 5' at the bottom.

Figure 5:
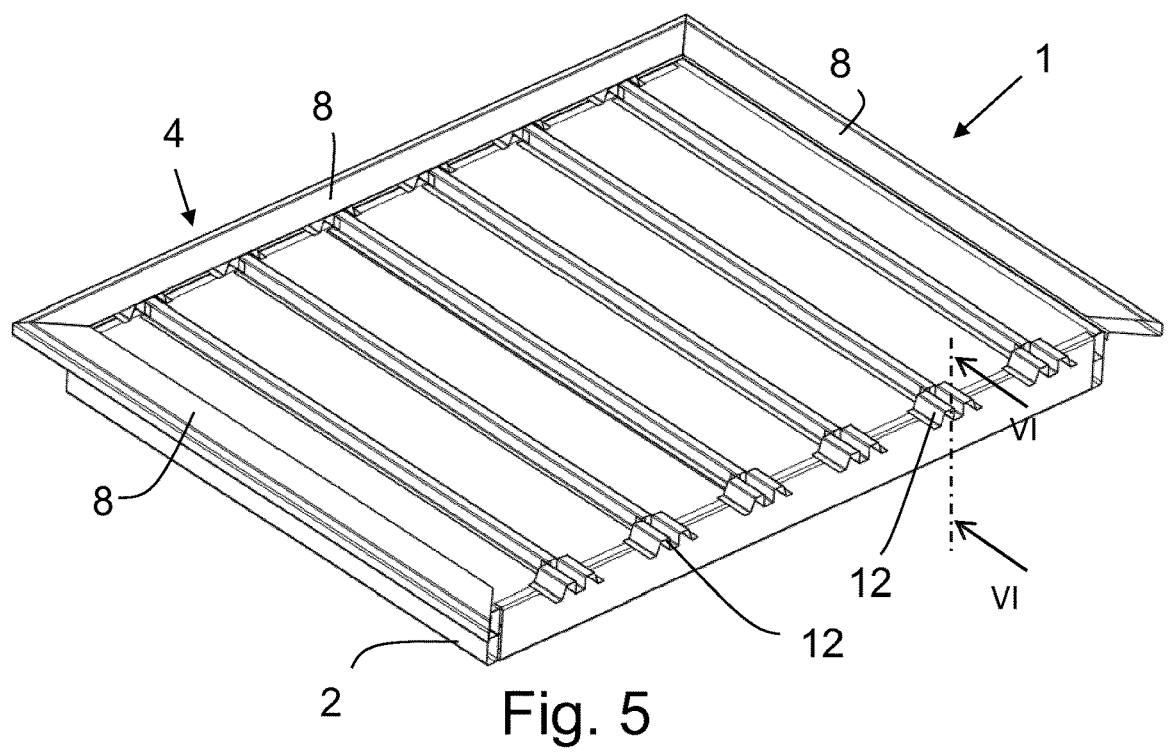
FIG. 5 shows a battery housing according to a third exemplary embodiment of the invention in a perspective view.
Figure 6:
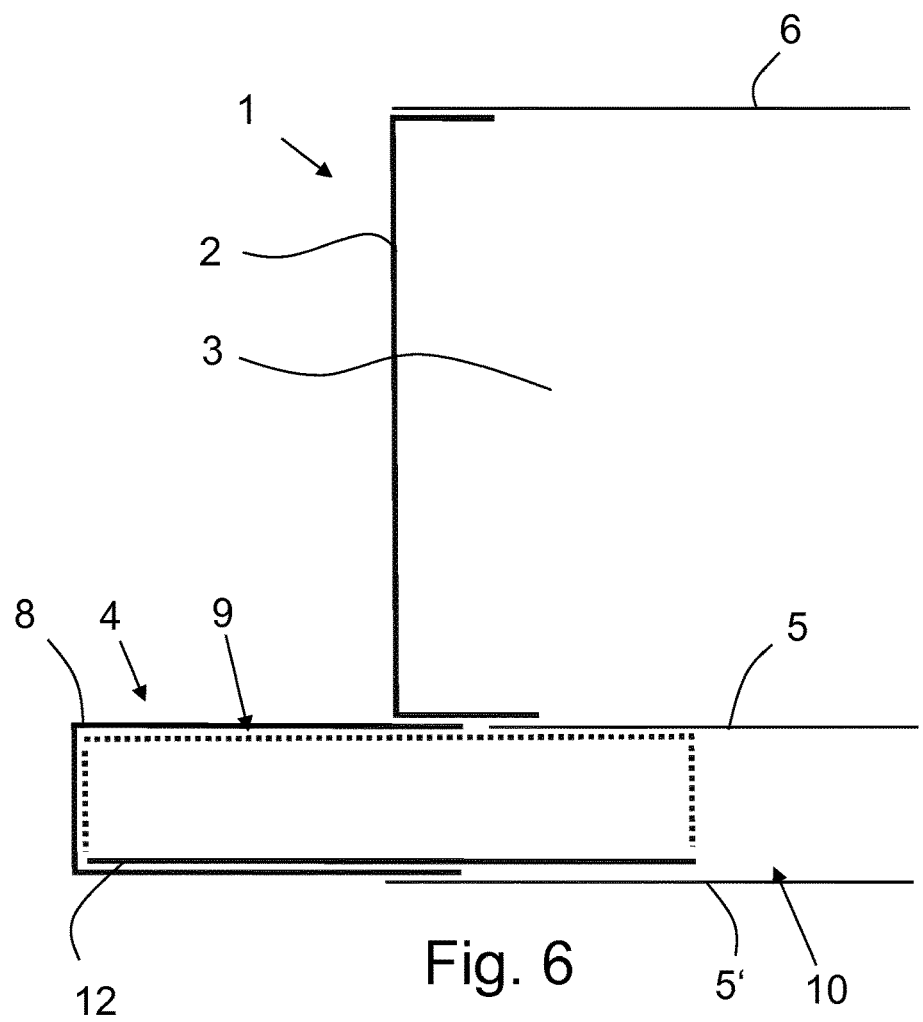
FIG. 6 shows the battery housing from FIG. 5 in a diagrammatic sectional depiction along the section line VI-VI shown in FIG. 5.

FIGS. 5 and 6 show a third exemplary embodiment of a battery housing 1 according to the invention. In the third exemplary embodiment, the mounting frame 4 is arranged at the height of the double floor of the battery housing 1. The mounting frame 4 has at least one mounting frame hollow structural element 8 with a mounting frame cavity 9. The first floor structural element 5 and the second floor structural element 5' form a double floor of the battery housing 1 comprising a floor cavity 10. Furthermore, a reinforcing profile 12 is provided which is arranged inside the mounting frame cavity 9 and inside the floor cavity 10. The reinforcing profile 12 runs from the mounting frame cavity 9 into the floor cavity 10 and thereby stiffens not only the mounting frame 4 and the floor structural elements 5, 5', but also the transitional region between the mounting frame 4 and the floor structural elements 5, 5'. The reinforcing profile 12 lies on an upper inner wall of the floor cavity 10, on an upper inner wall of the mounting frame cavity 9, a lower inner wall of the floor cavity 10, and a lower inner wall of the mounting frame cavity 9. It is joined to the corresponding inner walls at all these points.

On the right-hand side, the mounting frame 4 and the under-run protection 5' have been omitted from the drawing in order to show the reinforcing profile 12 situated therein (FIG. 5).

Figure 7:
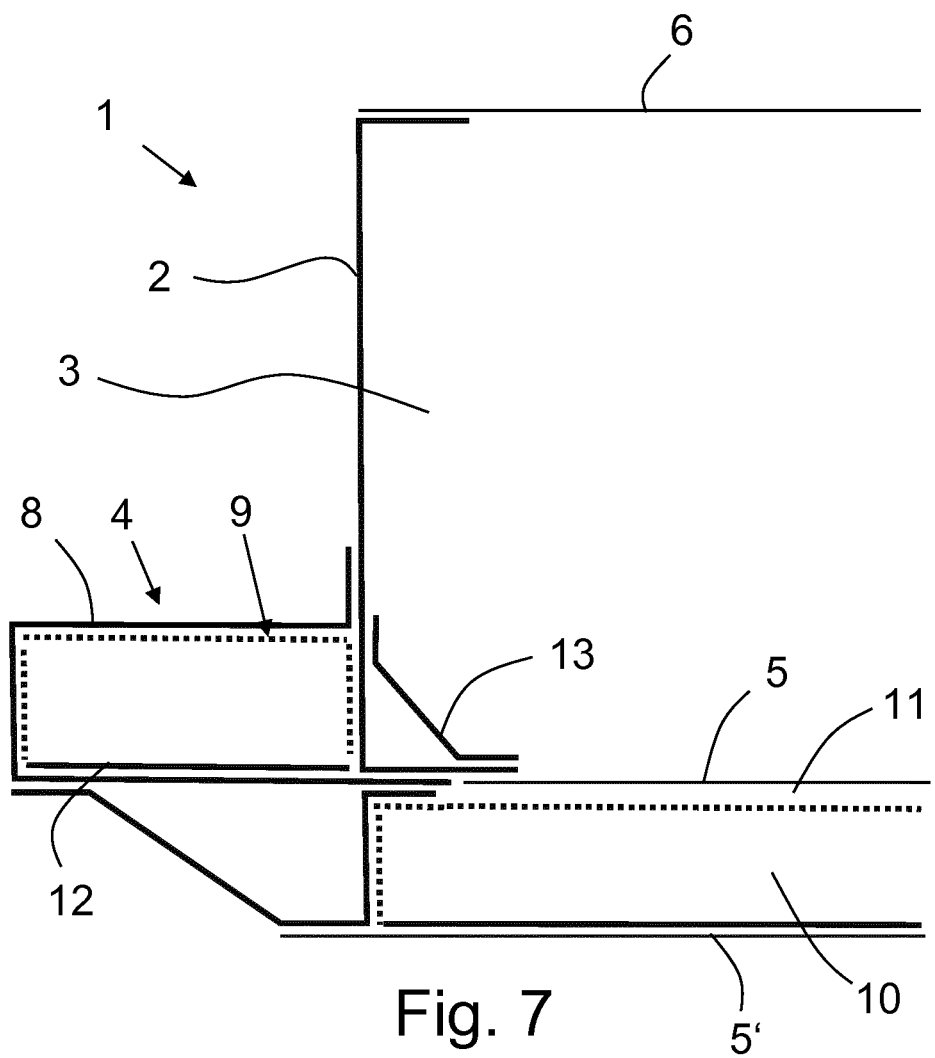
FIG. 7 shows a battery housing according to a fourth exemplary embodiment of the invention in a diagrammatic sectional depiction.

FIG. 7 shows a fourth exemplary embodiment of a battery housing 1 according to the invention. In this exemplary embodiment, the mounting frame 4 is arranged vertically offset to the double floor of the battery housing 1. A first reinforcing profile 11 is arranged on the floor structural elements 5, 5' to reinforce the floor structural elements 5, 5', and/or a second reinforcing profile 12 is arranged on the mounting frame 4 to reinforce the mounting frame 4. The first reinforcing profile 11 is arranged in a floor cavity 10 and is joined to the first floor structural element 5 and the second floor structural element 5'. The second reinforcing profile 12 is arranged in a mounting frame cavity 9 and is joined to the mounting frame hollow structural element 8, in particular to the lower and upper inner sides of the mounting frame cavity 9. The second reinforcing profile 12 is furthermore joined to the side wall 2 which delimits the mounting frame cavity 9.

In order to further improve the crash performance, in the battery housing 1 according to the fourth exemplary embodiment, an edge reinforcing element 13 is arranged between one of the side walls 2 and the first floor structural element 5 of the battery housing 1, and is connected, in particular joined, to a side wall 2 and the first floor structural element 5. The edge reinforcing element 13 is formed as a plate-like profile. For further reinforcement, the edge reinforcing element 13 has several beads.

Figure 8:
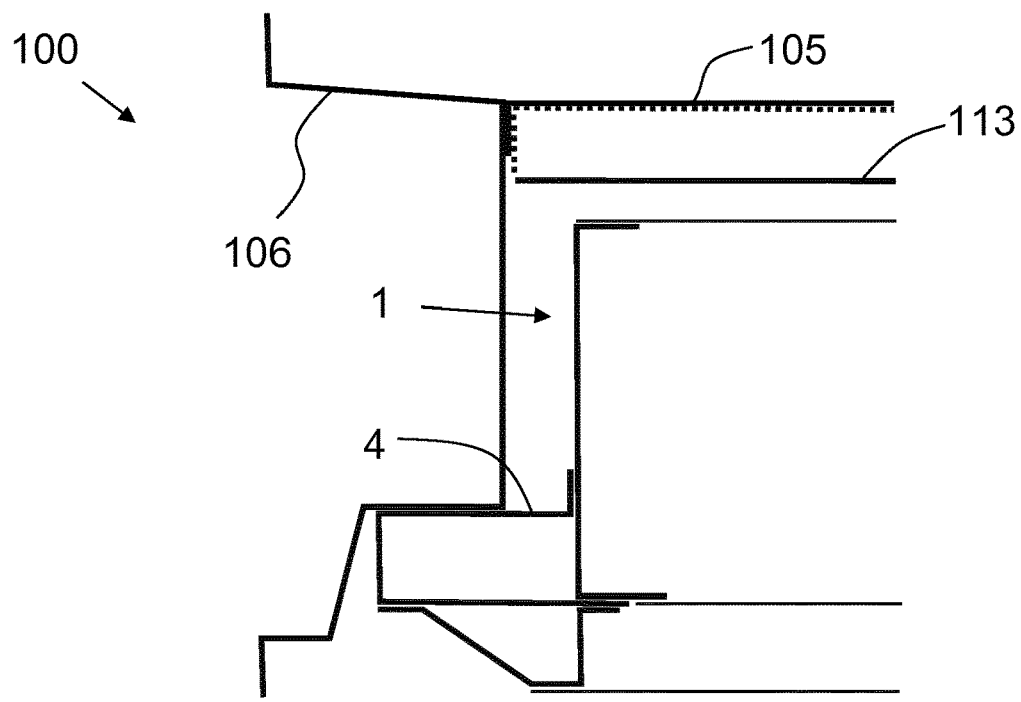
FIG. 8 shows a region of a chassis according to a first exemplary embodiment of the invention in a diagrammatic sectional depiction.

FIG. 8 shows a section through a lateral region of a chassis 100 according to a first exemplary embodiment of the invention. The chassis 100 has a sill 106. A chassis floor structural element 105 is attached to the sill 106 and runs horizontally up to a further sill on the opposite side of the chassis 100. The chassis 100 furthermore comprises a battery housing 1 for a vehicle battery which is arranged in the region below the chassis floor structural element 105. The battery housing 1 is connected to the sill 106 via the mounting frame 4.

A reinforcing profile 113 for reinforcing the chassis floor structural element 105 is arranged on the chassis floor structural element 105. The reinforcing profile 113 increases the resistance of the chassis 100 to crash loads acting from the side. The vehicle battery arranged in the interior of the battery housing 1 arranged on the sill 106 of the chassis 100 can thereby be better protected against lateral crash loads.

Figure 9:
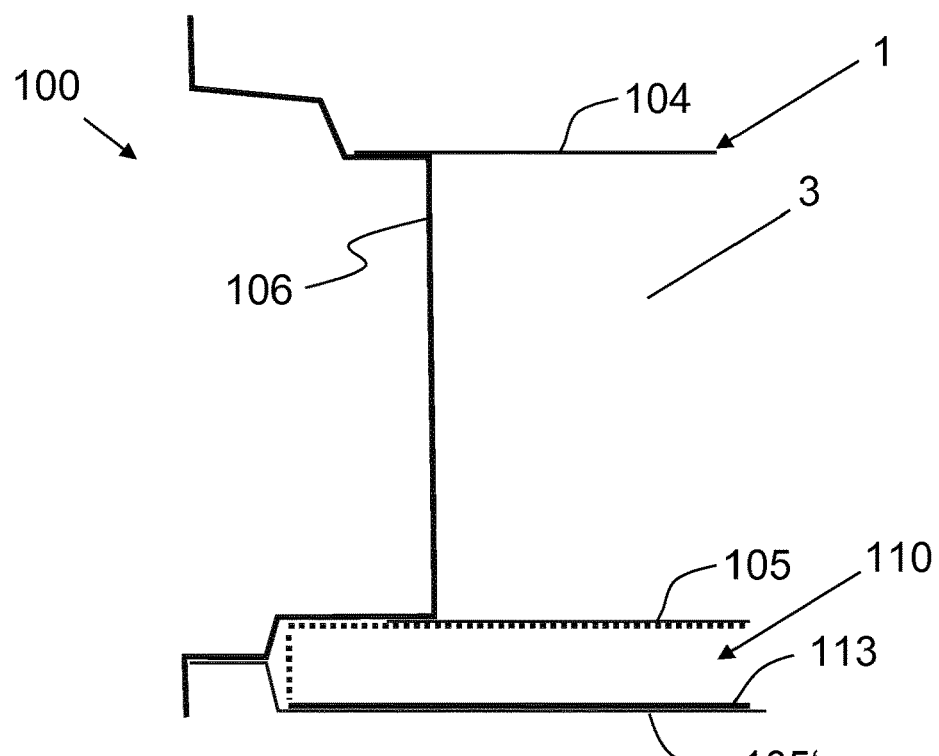
FIG. 9 shows a region of a chassis according to a second exemplary embodiment of the invention in a diagrammatic sectional depiction.

FIG. 9 shows a second exemplary embodiment of the chassis 100 according to the invention. The chassis 100 of the second exemplary embodiment has a sill 106. A first chassis floor structural element 105 and a second chassis floor structural element 105', both of which run horizontally, are connected to the sill 106. The first and second chassis floor structural elements 105, 105' together form a chassis floor structure in the manner of a double floor. The chassis floor structural elements 105, 105' may run from the sill 106 shown to a further sill on the opposite side of the chassis 100. A battery housing 1 with an interior 3 for receiving a vehicle battery is arranged in the region above the chassis floor structural elements 105, 105'. The battery housing 1 is formed at least by a vehicle floor 104, the sill 106 and the first chassis floor structural element 105. The vehicle floor 104, the sill 106 and the first chassis floor structural element 105 delimit the interior 3 of the battery housing 1.

In the chassis 100 of the second exemplary embodiment, a reinforcing profile 113 is arranged in a chassis cavity 110 which is delimited by the first chassis floor structural element 105 and the second chassis floor structural element 105'. To this extent, the reinforcing profile 113 is arranged on the first chassis floor structural element 105 and the second chassis floor structural element 105'.

Figure 10:
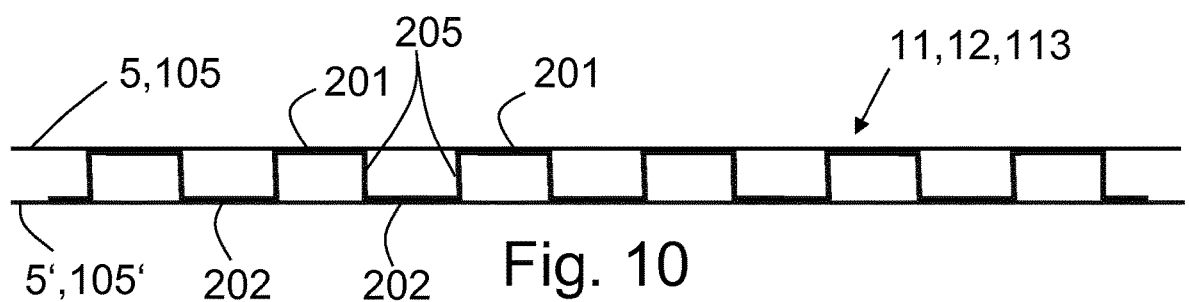
FIG. 10 shows a reinforcing profile according to a first exemplary embodiment of the invention in a diagrammatic sectional depiction.

FIG. 10 shows a reinforcing profile 11, 12, 113 as may be used in one of the above-mentioned exemplary embodiments of battery housings 1 and/or chassis 100 according to the invention. For illustrative purposes, the reinforcing profile 11, 12, 113 is shown arranged on a floor structural element 5, 105. By deviation from this depiction, the reinforcing profile 11, 12, 113 may be arranged on a mounting frame structural element.

The reinforcing profile 11, 12, 113 is made from a steel which has a minimum tensile strength of 780 MPa, in particular at least 980 MPa. The reinforcing profile 11, 12, 113 has a profile cross-section of meandering profile. In a direction running inside the cross-sectional planes parallel to the floor structural element 5, 105, first regions 201 which are connected, in particular joined, to the floor structural element 5, 105, alternate with second regions 202 which are connected, in particular joined, to a second floor structural element 5', 105' arranged parallel to the first floor structural element 5, 105. The reinforcing profile 11, 12, 113 is formed as a one-piece reinforcing profile. Webs 205 which connect the first and second regions 201, 202 are arranged between the first regions 201 and the second regions 202. The distance between adjacent webs 205 may lie in the range between 20 and 200 mm. The distance between adjacent webs 205 may be constant or vary in a direction running inside the cross-sectional planes parallel to the floor structural element 5, 105.

Figure 11:
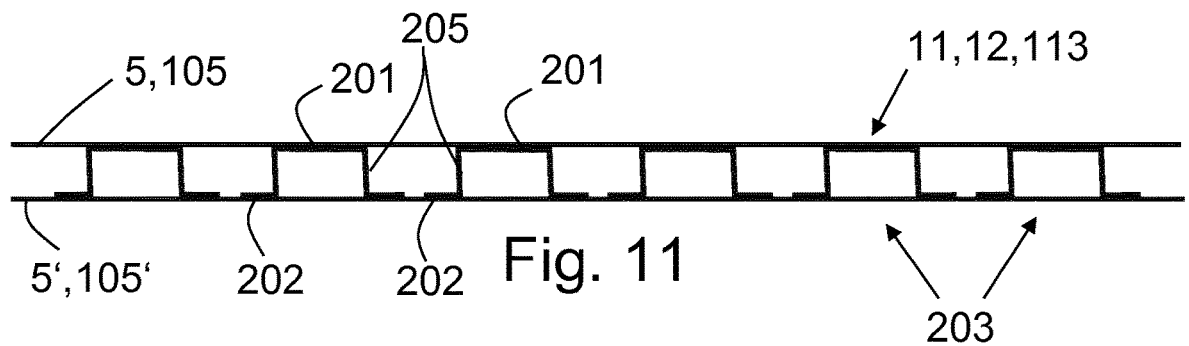
FIG. 11 shows a reinforcing profile according to a second exemplary embodiment of the invention in a diagrammatic sectional depiction.

FIG. 11 shows an alternative embodiment of the reinforcing profile 11, 12, 113 which may also be used in one of the above-mentioned exemplary embodiments of battery housings 1 and/or chassis 100 according to the invention. For illustrative purposes, the reinforcing profile 11, 12, 113 is shown arranged on a floor structural element 5, 105. By deviation from this depiction, the reinforcing profile 11, 12, 113 may be arranged on a mounting frame structural element.

The reinforcing profile 11, 12, 113 is also made from a steel which has a minimum tensile strength of 780 MPa, in particular at least 980 MPa. The reinforcing profile 11, 12, 113 has a profile cross-section of meandering profile. In a direction running inside the cross-sectional planes parallel to the floor structural element 5, 105, first regions 201 which are connected, in particular joined, to the floor structural element 5, 105, alternate with second regions 202 which are connected, in particular joined, to a second floor structural element 5', 105' arranged parallel to the first floor structural element 5, 105. In contrast to the reinforcing profile 11, 12, 113 shown in FIG. 10, the reinforcing profile 11, 12, 113 in FIG. 11 is formed as a multipiece reinforcing profile which is composed of several partial reinforcing profiles 203. The partial reinforcing profiles 203 are arranged parallel to each other and may be spaced apart from each other as shown in FIG. 11. Alternatively, it is possible that the partial reinforcing profiles 203 lie against each other, in particular are joined together. In the present example, the partial reinforcing profiles 203 are formed as top-hat profiles. Webs 205 which connect the first and second regions 201, 202 are arranged between the first regions 201 and the second regions 202. The distance between adjacent webs 205 may lie in the range between 20 and 200 mm. The distance between adjacent webs 205 may be constant, which means that the partial reinforcing profiles 203 are arranged at a constant distance from each other. Alternatively, the distance between the webs 205 or the partial reinforcing profiles 203 may vary in a direction running inside the cross-sectional planes parallel to the floor structural element 5, 105.

According to a derivative of the exemplary embodiments of reinforcing profiles shown in FIGS. 10 and 11, the reinforcing profile 11, 12, 113 used may have a first profile cross-section in a first cross-sectional plane, and a second profile cross-section in a second cross-sectional plane parallel to the first cross-sectional plane, wherein the first and second profile cross-sections are different. Alternatively or additionally, the reinforcing profile 11, 12, 113 may have one or more cut-outs.

The battery housings 1 described above for a vehicle battery have side walls 2 which laterally delimit an interior 3 of the battery housing 1. A mounting frame 4 is arranged running externally around the side walls 2 for mounting the battery housing 1 to a chassis 100 of an electric vehicle. Furthermore, the battery housing 1 has a floor structural element 5 which delimits the interior 3 of the battery housing 1 at the bottom. A first reinforcing profile 11 for reinforcing the floor structural element 5 is provided on the floor structural element 5, and/or a second reinforcing profile 12 for reinforcing the mounting frame 4 is arranged on the mounting frame 4. Furthermore, chassis 100 are described for electric vehicles, with a chassis floor structural element 105 running in particular horizontally, and a battery housing 1 for a vehicle battery which is arranged above or below the chassis floor structural element 105. A third reinforcing profile 113 for reinforcing the chassis floor structural element 105 is arranged on the chassis floor structural element 105. Due to the provision of the reinforcing profiles 11, 12, 113, the vehicle battery arranged in the interior 3 of the battery housing 1 can be better protected against lateral crash loads.

LIST OF REFERENCE SIGNS

1 Battery housing
2 Side wall
3 Interior
4 Mounting frame
5 Floor structural element
5' Floor structural element (under-run protection)
6 Housing cover
7 Beam
8 Mounting frame hollow structural element
9 Mounting frame cavity
10 Floor cavity
11 Reinforcing profile
12 Reinforcing profile
13 Edge reinforcing element
100 Chassis
104 Vehicle floor
105 Chassis floor structural element
105' Chassis floor structural element (floor structure under-run protection)
106 Sill
110 Chassis cavity
113 Reinforcing profile

The invention claimed is:

1. A battery housing for a vehicle battery, the battery housing comprising:
    side walls which laterally delimit an interior of the battery housing, with a mounting frame running externally around the side walls for mounting the battery housing on a chassis of an electric vehicle;
    a floor structural element delimiting the interior of the battery housing at the bottom; and
    at least one reinforcing profile for reinforcing the mounting frame and arranged on said mounting frame, wherein the mounting frame comprises a mounting frame hollow structural element with a mounting frame cavity, wherein the at least one reinforcing profile is joined to a side wall of the side walls and arranged inside the mounting frame cavity, wherein the at least one reinforcing profile has one of a meander-like and top-hat profile along a length-wise cross-section which is arranged parallel to the side wall of the side walls.

2. The battery housing as claimed in claim 1, wherein the reinforcing profile has a first profile cross-section along a first cross-sectional plane, and a second profile cross-section along a second cross-sectional plane parallel to the first cross-sectional plane, wherein the first and second profile cross-sections are different.

3. The battery housing as claimed in claim 1, wherein the reinforcing profile has a first material thickness in a first region of the reinforcing profile and a second material thickness in a second region of the reinforcing profile, wherein the first and second material thicknesses are different.

4. The battery housing as claimed in claim 1, wherein the reinforcing profile comprises a cut-out.

5. The battery housing as claimed in claim 1, wherein the reinforcing profile is joined to an inner wall delimiting the floor cavity and the reinforcing profile is joined to a floor structural element.

6. The battery housing as claimed in claim 1, wherein an edge reinforcing element is arranged between one of the side walls and the floor structural element of the battery housing and is connected, in particular joined, to a side wall and the floor structural element.

* * * * *